US010453367B2

(12) United States Patent
Bronte et al.

(10) Patent No.: US 10,453,367 B2
(45) Date of Patent: Oct. 22, 2019

(54) DETECTING CORRECT OR INCORRECT OPERATION OF A DISPLAY PANEL

(71) Applicant: FICOSA ADAS, S.L.U., Barcelona (ES)

(72) Inventors: Victor Iglesias Bronte, Barcelona (ES); Jose Antonio Gomez Requena, Barcelona (ES)

(73) Assignee: FICOSA ADAS, S.L.U., Barcelona (ES)

( * ) Notice: Subject to any disclaimer, the term of this patent is extended or adjusted under 35 U.S.C. 154(b) by 0 days.

(21) Appl. No.: 15/856,880

(22) Filed: Dec. 28, 2017

(65) Prior Publication Data

US 2018/0190172 A1    Jul. 5, 2018

(30) Foreign Application Priority Data

Dec. 30, 2016    (EP) .................................. 16382673

(51) Int. Cl.
G09G 3/00       (2006.01)
*G09G 3/3208*   (2016.01)
*H04N 17/04*    (2006.01)

(52) U.S. Cl.
CPC .......... *G09G 3/006* (2013.01); *G09G 3/3208* (2013.01); *H04N 17/045* (2013.01); *G09G 2330/02* (2013.01); *G09G 2330/12* (2013.01); *G09G 2380/10* (2013.01)

(58) Field of Classification Search
None
See application file for complete search history.

(56) References Cited

U.S. PATENT DOCUMENTS

2002/0199097 A1    12/2002  Ven de Van
2007/0013693 A1     1/2007  Hedrick
(Continued)

FOREIGN PATENT DOCUMENTS

DE    102014220373 A1    4/2016
WO      2008120143 A2   10/2008

OTHER PUBLICATIONS

Extended European Search Report for Application No. 16382673.8, dated May 3, 2017, 13 pages.

*Primary Examiner* — Samira Monshi
(74) *Attorney, Agent, or Firm* — Brooks Kushman P.C.

(57) ABSTRACT

Methods are provided for detecting correct or incorrect operation of a display panel (e.g. LED or OLED) during display of a video signal, the display panel being associable with a controller system. The method comprises: adding, by the controller system, a dynamic pattern into the video signal for inducing the display panel to display the video signal with the added dynamic pattern substantially imperceptible to human vision, and to provoke an expected power consumption evolution during the display of the video signal with the added dynamic pattern; measuring, by the controller system, power consumed by the display panel during the display of the video signal with the added dynamic pattern to determine an actual power consumption evolution; and determining, by the controller system, whether the actual power consumption evolution corresponds to the expected power consumption evolution. Controller systems and computer programs suitable for performing such detection methods are also provided.

11 Claims, 3 Drawing Sheets

(56) References Cited

U.S. PATENT DOCUMENTS

| | | | |
|---|---|---|---|
| 2007/0103399 A1* | 5/2007 | Correa | G09G 3/2944 345/63 |
| 2010/0301876 A1 | 12/2010 | Hartrampf et al. | |
| 2011/0227964 A1* | 9/2011 | Chaji | G09G 3/006 345/690 |
| 2015/0049072 A1 | 2/2015 | Eggert et al. | |
| 2016/0217719 A1 | 7/2016 | Kabatek et al. | |

* cited by examiner

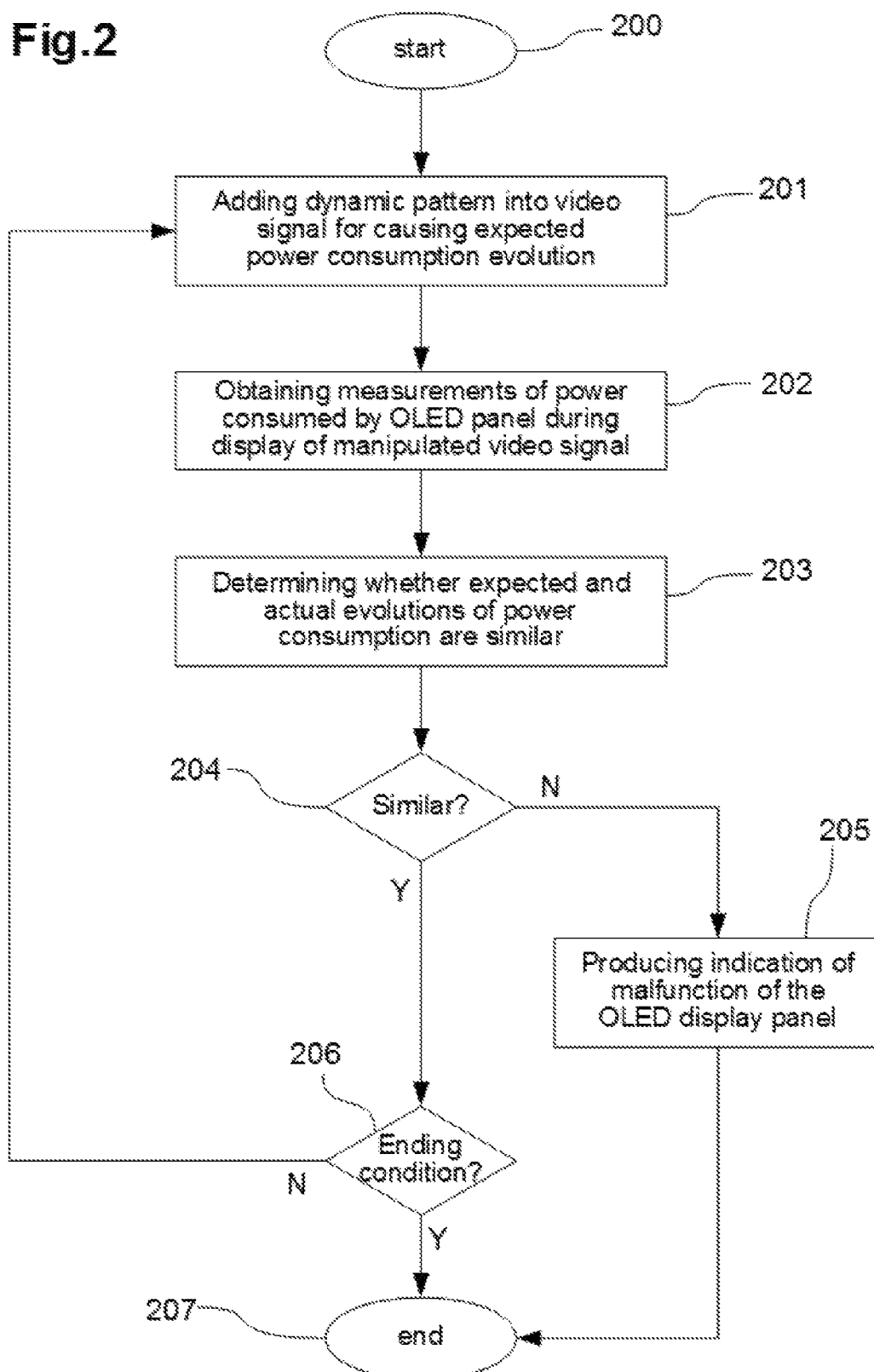

DETECTING CORRECT OR INCORRECT OPERATION OF A DISPLAY PANEL

CROSS-REFERENCE TO RELATED APPLICATIONS

This application claims priority to EP application Serial No. EP16382673.8 filed Dec. 30, 2016, the disclosure of which is hereby incorporated in its entirety by reference herein.

TECHNICAL FIELD

The present disclosure relates to methods for detecting correct or incorrect operation of a display panel, and to computer programs and controllers suitable for performing such methods.

BACKGROUND

Different methods of monitoring the operation of a display panel are known in the state of the art, with the aim of e.g. detecting correct or incorrect operation of the display panel.

In most of the cases, reference performance values need to be stored in advance (i.e., at the factory, during calibration) in order to determine the condition/status of the display panel. In other cases, intervention of the user is counted to detect malfunction of the display panel. In further cases, reference values are continuously updated, wherein determination of those values is an obtrusive operation (e.g. displaying patterns across the screen) and cannot be performed in parallel with normal use of the display screen.

US2016/0217719 A1 discloses a test method for a screen (such as e.g. an OLED screen) in a vehicle comprising the steps of: displaying a raster image on a screen, measuring the electrical current intensity flowing as a result; and comparing the measured electrical current intensity to a stored reference current intensity. It is ascertained whether the raster image was generated without errors dependent on the comparison. The reference current intensity has been determined at manufacture or production time. Accuracy of this method may deteriorate over time due to the aging of the screen, since intensity measurements obtained at different times in the operation life of the screen may significantly differ from each other.

WO2008120143 A2 discloses a method for determining a status and/or condition of an LED/OLED device, comprising the steps of: applying at least one time varying signal to the LED/OLED device, acquiring the response to the at least one time varying signal, correlating the response with predetermined values, and determining the status/condition on the basis of the correlation result. The time varying signals may be selected out of the group of: sinusoidal signals, chirp signals, wideband signals, small band signals, single frequency signals, multi frequency signals, step signal or ramp signals. The user of the LED/OLED unit will not recognize the operation of the diagnostic device since the applied time varying signals are very small and hence do not result in an illumination of the LED/OLED unit. The time varying signals are added or superimposed to the power voltage supplied to the OLED.

DE102014220373 describes the difficulty of implementing displays in automotive applications for displaying critical information (warning lights, etc.) while staying within the limits set by the ASIL requirements. A screen is used for displaying critical information in an area of the screen that the user checks frequently, so that the user himself becomes aware of a malfunction of the display. This method thus looks for an increase in safety of a display panel used in automotive applications but counts on the user to detect malfunction of the panel.

US2007013693 A1 relates to critical applications of displays in the field of avionics. An integrity check method for an aircraft cockpit display is discussed in the prior art document, wherein aircraft sensor information is sent to a graphics rendering processor for rendering an image to be presented in a cockpit display. In parallel, a second processor calculates a number of points of a subset of the image ("points of light"), which are then compared to the full-rendered image. The integrity check passes if the subset of points ("points of light") coincides with the full-rendered image. This prior art method is therefore focused on avoiding corruption of sensitive data being sent to the panel, rather than on determining adequate or defective functioning of the display panel irrespective of the data sent to the panel.

US20110227964A1 discloses a system and method for deriving a sequence of OLED non-uniformity test patterns. A pattern generator generates a full sequence of display patterns according to a transform function, such as a discrete cosine transformation or wavelet transformation. A driver drives a display with each of the sequence of patterns. A sensor senses a property of the display, such as a total current for the display, for each of the sequence of patterns. An extraction unit derives a pixel non-uniformity model using the sensed properties and an inverse of the transform function. Patterns that contribute less than a threshold amount to the non-uniformity model can be identified and deleted to derive a sparse sequence of patterns, which can be stored in a memory. The sparse sequence of patterns can be used to test the display and extract a set of pixel non-uniformity values. The pixel non-uniformity values can be used to generate a correction signal for the display. In the proposed system and method, reference values are thus continuously established (and updated) by performing an obtrusive operation (displaying patterns across the screen) which cannot be performed in parallel with normal use of the display screen.

An object of the present disclosure is improving the prior art methods, computer programs and controllers (systems) for detecting correct or incorrect operation of a display panel.

SUMMARY

In a first aspect, a method is provided for detecting correct or incorrect operation of a display panel during display of a video signal, the display panel being associable (connectable) with a controller system.

The method comprises adding, by the controller system, a dynamic pattern into the video signal for inducing the display panel to display the video signal with the added dynamic pattern substantially imperceptible to human vision, and to provoke an expected power consumption evolution during the display of the video signal with the added dynamic pattern.

The method further comprises measuring, by the controller system, power consumed by the display panel during the display of the video signal with the added dynamic pattern to determine an actual power consumption evolution.

The method still further comprises determining, by the controller system, whether the actual power consumption evolution corresponds to the expected power consumption evolution.

The display panel may be e.g. a Liquid Crystal Display (LCD) panel, or a Light Emitting Diode (LED) display panel, or an Organic-LED (OLED) display panel, or any display panel wherein power consumption has a relationship with (or depends on) the displayed image(s).

The proposed method is based on manipulating a video signal to be displayed on the display panel for causing the display of the manipulated signal in such a way that the manipulation is transparent to (not observable by) a user and, furthermore, an expected evolution (variation) of power consumption is expected to occur due to the manipulation. Power consumed by the display panel is measured during display of the manipulated signal and an evolution of the measured power consumption is determined. Correct or incorrect functioning of the display panel is determined depending on whether the expected evolution of the power consumption is similar to the measured or actual evolution of the power consumption. The manipulation of the video signal comprises including a dynamic pattern into the video signal. The video signal may be manipulated in a diversity of manners for causing the manipulation to be imperceptible to human vision.

The dynamic pattern may be defined as one or more predefined images (or pattern frames) to be added into one or more video frames of a video signal to be displayed on a display panel, so that one or more outstanding changes in power consumed by the display panel are caused during display of the pattern frame(s) in the "manipulated" video signal.

Video frames may be manipulated to a sufficient extent so that a completely detectable evolution (variation) of power consumption of the display panel is induced. This represents an improvement with respect to prior art methods based on, for example, adding or superimposing time varying signals to the power voltage supplied to the display unit. Since the time varying signals must be very small for avoiding disturbances in the "normal" illumination of the display unit, corresponding effects (or consequences) to be evaluated may result, at least in some circumstances, not detectable or detectable with uncertain accuracy. An advantage of the present method is therefore that correct or incorrect functioning of the display panel may be detected in a clearer (or more reliable) manner in comparison with the prior art methods.

The accuracy of the suggested method does not deteriorate over time because correct or incorrect functioning of the display panel is determined depending on whether the expected and measured/actual evolutions of power consumption are similar or not. That is, in the case of correct functioning, the evolutions are expected to be very similar to each other irrespective of whether the display panel has suffered some deterioration due to aging factors. A significant disparity between the expected and actual/measured evolutions may be indicative of malfunction of the display panel. An aging (and temperature) independent detection method is thus provided.

Another advantage of the disclosed method may be that it is transparent to the user (of the display panel) and does not count on the user to detect correct or incorrect functioning of the panel. This represents an improvement with respect to prior art methods that require the participation of the user for determining whether the display panel is working correctly or incorrectly.

Another benefit of the proposed method may be that correct or incorrect functioning of the display panel is determined irrespective of the content of the video signal (to be displayed). Only the expected and actual/measured evolutions of the power consumption (by the display panel) are considered, instead of relying on, for example, whether the video signal (to be displayed) includes corrupted (sensitive) data or not. The proposed detection method may thus present a balance between simplicity and accuracy.

Herein, the expression "actual/measured evolution of power consumption" may be considered substantially equivalent to the expression "evolution of actual/measured power consumption". That is, these two expressions or similar may be understood as substantially referring to the same principle or conception.

A further interesting contribution of the suggested method may be that obtrusive operation of the display panel (e.g., displaying patterns across the screen) is avoided, which may permit detecting correct or incorrect functioning of the panel in parallel with normal use of the display panel. As commented in detail in other parts of the description, different approaches may be applied to make the manipulation of the video frames imperceptible to human vision during their displaying on the display panel.

Similarity between the expected and actual/measured evolutions of power consumption may be determined depending on whether a deviation between the expected and actual/measured evolutions of power consumption is within a predetermined deviation threshold or range. This predefined deviation threshold or range may be established depending on, for example, technical features of the display panel, its application, etc. For example, the deviation threshold/range may be greater or smaller depending on the type of the display panel. Since power consumption varies less in a LCD panel than in an OLED panel, the deviation threshold/range may be smaller in the first case than in the second case.

In some examples, a video frame may be modified or replaced in such a way that a distorted part (pattern frame) of the video frame is displayable on a physically covered part of the display panel, so that displaying of the manipulated part results substantially imperceptible to human vision. This physical coverage may be implemented by, for example, a screen frame of the display panel having a main function of, for example, decorating, protecting, fastening, etc. the display panel. That is, a pre-existing screen frame may be re-used to make the manipulation of the video signal imperceptible to human vision.

In examples wherein the video signal has a relatively high frequency in terms of, for example, video frames per second, a video frame may be manipulated in a manner that the manipulation/distortion is included taking into account the frequency of the video signal, so that the manipulation/distortion results imperceptible to human vision. Details about this frequency-dependent approach are provided in other parts of the description.

A manipulation of a video frame may comprise, in some examples, replacing or overlapping the video frame by corresponding pattern frame. The term "replacing" means that the whole (original) video frame is substituted by a new video frame including the pattern frame (with e.g., distorting image points or pixels) and, optionally, a portion taken from the original video frame. The term "overlapping" means that a part of the video frame is kept while another part is substituted by the pattern frame (with e.g., distorting image points or pixels).

Video frames may be manipulated in such a way that a significant difference in power consumption by the display panel is induced between displaying of at least two manipulated video frames, so that required evolution(s) of power consumption may result clearly detectable. For instance, in the case of, for example, OLED panels, one of the video frames may be manipulated by adding a pattern frame with white as a predominant color (high power consumption), and another of the video frames may be manipulated by adding a pattern frame with black as a predominant color (low power consumption). This way, a clearly detectable evolution from higher consumption (white color) to lower consumption (black color) or from lower consumption (black color) to higher consumption (white color) is ensured.

In a second aspect, a computer program product is provided comprising program instructions for causing a controller system (e.g., a computing system) to perform any of the above methods for detecting correct or incorrect operation of a display panel.

In a third aspect, a controller system is provided for detecting correct or incorrect operation of a display panel during display of a video signal, the display panel being associable (e.g., connectable) with the controller system.

The controller system comprises a dynamic pattern adding module for adding a dynamic pattern into the video signal for inducing the display panel to display the video signal with the added dynamic pattern substantially imperceptible to human vision, and to provoke an expected power consumption evolution during the display of the video signal with the added dynamic pattern.

The controller system further comprises a measurement module for measuring power consumed by the display panel during the display of the video signal with the added dynamic pattern to determine an actual power consumption evolution.

The controller system still further comprises a detector module for determining whether the actual power consumption evolution corresponds to the expected power consumption evolution.

The controller system (i.e., the modules comprised therein) may be implemented by a computing program, electronic device or a combination thereof, as described in more detail in other parts of the disclosure.

As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the described particular module.

Further, the modules may be implemented across multiple devices and/or other components local or remote to one another. Additionally, the modules may be moved from one device and added to another device, and/or may be included in both devices. Any software implementations may be tangibly embodied in one or more storage media, such as, for example, a memory device, a floppy disk, a compact disk (CD), a digital versatile disk (DVD), or other devices that may store computer code.

In some examples, a safety-critical system may be provided comprising a display system including any of the above controller systems and the display panel. A vehicle comprising such a safety-critical system may also be provided.

These and other advantages and features will become apparent in view of the detailed description and drawings.

BRIEF DESCRIPTION OF THE DRAWINGS

Non-limiting examples of the present disclosure will be described in the following, with reference to the appended drawings, in which:

FIG. 2 is a flowchart schematically illustrating methods according to examples for detecting correct or incorrect operation of an OLED display panel.

DETAILED DESCRIPTION

Figure 1:
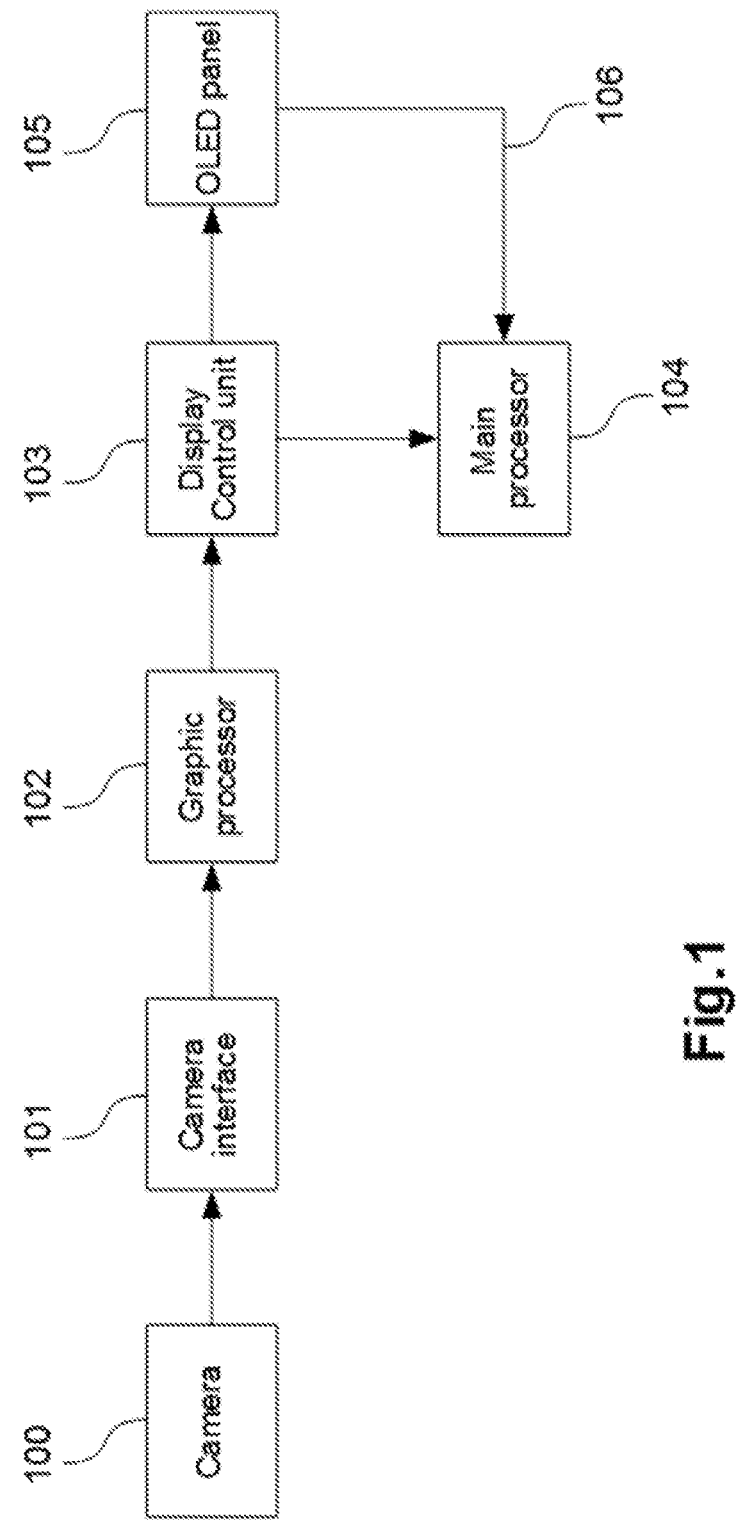
FIG. 1 is a block diagram schematically representing a safety-critical system including a controller system according to examples.

FIG. 1 is a block diagram schematically representing a safety-critical system including a controller system according to examples. In safety-critical systems, a display panel 105 may be associated to a camera 100 in the sense that the display panel 105 shows in real time what is being captured by the camera 100. Particular examples of such systems may include security systems with video surveillance camera(s) or with vision systems for vehicles of any type and movable on any medium, such as e.g. roadways, railways, boats, airplanes, etc.

A safety-critical system may comprise the camera 100, a camera interface 101, the OLED display panel 105, and a controller system 102-104 for at least detecting correct or incorrect operation of the OLED display panel 105 during display of a video signal. The camera 100 may be, in general, any kind of generic image generator configured to therefore deliver video information. The camera interface 101 may be a software/hardware module interfacing (i.e., connecting through proper protocol) the camera 100 and the controller system 102-104.

The controller system may include a graphic processor 102, a display control unit 103, and a main processor 104 which may be implemented as separate processing blocks or as a single processing block. For example, the main processor 104 and the graphic processor 102 may be implemented in the same block, the graphic processor 102 may integrate the camera interface 101 and/or the display control unit 103, etc.

In the particular example shown, the controller system is shown formed by three separate processing blocks 102-104. The graphic processor 102 may be configured to receive video information from the camera 100 and the camera interface 101 and to acquire or generate, based on the received video information, the video signal to be displayed on the OLED display panel 105.

The display control unit 103 may implement a dynamic pattern adding module. The module may be configured to add a dynamic pattern into the video signal for inducing the OLED display panel 105 to behave in a particular manner. The behavior of the OLED display panel 105 may include displaying the video signal with the added dynamic pattern substantially imperceptible to human vision, and provoking an expected power consumption evolution (by the display panel) during the display of the video signal with the added dynamic pattern.

The main processor 104 may implement a measurement module and a detector module. The measurement module may be configured to measure power consumption of the OLED display panel 105 during the display of the manipulated video signal (with added dynamic pattern) to determine an actual power consumption evolution. Power consumption measurements may be determined by the measurement module based on sensor signals 106 received from a power consumption sensor that may be internal or external to the OLED panel 105. Sensors suitable for the "measurement" role may be those that are configured to calculate evolutions of operational parameters, such as e.g., ammeters, voltmeters, wattmeter, etc. This kind of sensors is well-known in the state of the art, so details about them and the corresponding functionalities are not provided herein.

The detector module may be configured to determine whether the actual power consumption evolution corresponds to the expected power consumption evolution. If a deviation between the expected and measured/actual evolutions of power consumption is not within acceptability threshold or range, an indicator of malfunction of the OLED panel may be produced. Data representing the expected power consumption evolution may be obtained by the detector module from a table, or may be received by the detector module from the display control unit 103, etc.

The controller system 102-104 may be implemented by computer program, electronic device or a combination thereof. The computing program may be a set of instructions and the controller system 102-104 may comprise a memory and a processor, embodying the set of instructions stored in the memory and executable by the processor. The instructions may comprise functionality to execute methods for detecting correct or incorrect operation of the OLED display panel 105 during display of the video signal.

In case the controller system 102-104 is implemented only by the electronic device, the controller system 102-104 may be, for example, a Complex Programmable Logic Device (CPLD), a Field Programmable Gate Array (FPGA) or an Application-Specific Integrated Circuit (ASIC).

In case the controller system 102-104 is a combination of electronic device and computing program, the computing program may be a set of instructions and the electronic device may be any electronic circuit capable of implementing the corresponding step or steps of the cited methods for detecting correct or incorrect operation of the OLED display panel 105 during display of the video signal.

The computer program may be embodied on a storage medium (for example, a CD-ROM, a DVD, a USB drive, a computer memory or a read-only memory) or carried on a carrier signal (for example, on an electrical or optical carrier signal).

The computer program may be in the form of source code, object code, a code intermediate source and object code such as in partially compiled form, or in any other form suitable for use in the implementation of methods for detecting correct or incorrect operation of the OLED display panel 105 during display of the video signal. The carrier may be any entity or device capable of carrying the computer program.

For example, the carrier may comprise a storage medium, such as a ROM, for example a CD ROM or a semiconductor ROM, or a magnetic recording medium, for example, a hard disk. Further, the carrier may be a transmissible carrier such as an electrical or optical signal, which may be conveyed via electrical or optical cable or by radio or other suitable alternative.

When the computer program is embodied in a signal that may be conveyed directly by a cable or other device or suitable alternative, the carrier may be constituted by such cable or other device or suitable alternative.

Alternatively, the carrier may be an integrated circuit in which the computer program is embedded, the integrated circuit being adapted for performing, or for use in the performance of, the relevant methods.

FIG. 2 is a flowchart schematically illustrating methods according to examples for detecting correct or incorrect operation of an OLED display panel. These detection methods may be performed by controller systems such as the ones described with respect to previous figure. Number references from FIG. 1 may thus be used in the following description about FIG. 2.

At block 200, the method may be started as a result of, for example, receiving by the controller system 102-104 a request for detecting correct or incorrect operation of the OLED display panel 105.

At block 201, a dynamic pattern may be added, by the controller system 102-104, into the video signal for inducing the OLED display panel to display the video signal with the added dynamic pattern substantially imperceptible to human vision, and to provoke an expected power consumption evolution during the display of the video signal with the added dynamic pattern. This expected power consumption evolution may refer to power expected to be consumed by the OLED panel as a whole or by the OLED panel on a per RGB-channel basis.

At block 202, measurements of power consumption of the OLED display panel may be determined, by the controller system 102-104, during the display of the video signal with the added dynamic pattern. These measurements may refer to power consumed by the OLED panel as a whole or by the OLED panel on a per RGB-channel basis. An actual power consumption evolution may be determined, by the controller system 102-104, based on the obtained power consumption measurements.

At block 203, the controller system 102-104 may determine whether the actual power consumption evolution corresponds to the expected evolution of power consumption (of the OLED panel as a whole or on a per RGB-channel basis). The correspondence may be determined depending on whether deviation(s) between the expected and actual/measured evolutions of power consumption (of the OLED panel as a whole or on a per RGB-channel basis) is within predefined acceptability threshold(s) or range(s).

The correspondence between expected and actual power consumption evolutions may also be evaluated by verifying whether a given measurement (in the actual power consumption evolution) is substantially higher, equal or lower than one or more previous measurements (in the actual power consumption evolution). A result of the verification indicating that the given measurement is higher, equal or lower than the previous measurement(s) may be determined as acceptable or unacceptable depending on the expected power consumption evolution.

These evaluation steps may be performed for each (or a selection) of the measurements constituting the actual power consumption evolution. A predefined number of inacceptable results (as defined above) may indicate that inacceptable deviation(s) between expected and actual/measured evolutions of power consumption (of the OLED panel as a whole or on a per RGB-channel basis) have been detected. Data representing the inacceptable deviation(s) may be provided to decision block 204.

The one or more previous measurements may comprise a predefined number of last measurements (immediately) preceding the given measurement in the actual power consumption evolution. Some filtering may be performed in the previous measurement(s) for eliminating or attenuating punctual errors in, for example, some power consumption measurements. For example, the last N measurements preceding the given measurement (wherein e.g. N=10 or 20 or 30, etc.) may be averaged, and the average may be compared with the given measurement to determine whether it is higher, equal or lower than the average representing the previous measurement(s).

At the decision block 204, if deviation(s) between expected and actual/measured evolutions of power consumption (of the OLED panel as a whole or on a per RGB-channel basis) is (are) not acceptable, the method may continue to block 205 wherein an indication of malfunction of the OLED panel may be generated. Otherwise, the method may proceed to block 206 wherein reception or existence of an ending condition is verified. The ending condition may indicate, for example, that a vehicle wherein the OLED panel is being used has been turned off.

At the decision block 206, in case of reception or existence of the ending condition (e.g. vehicle turned off), a transition to final block 207 may be performed for finishing the execution of the method. Otherwise, the method may loop back to the block 201 for performing a new iteration of previously described blocks 201-206.

In some examples, Y/UV (or only Y) measurements and/or Ycb/CR (or only Ycb) measurements may be considered alternatively or in addition to the aforementioned RGB measurements.

Figure 3A:
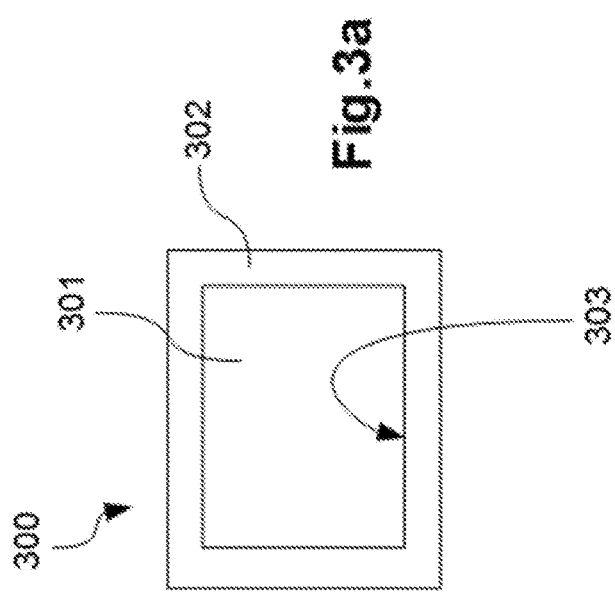
FIGS. 3a and 3b schematically represent different ways of manipulating video frame(s) in the context of detection methods similar to those illustrated by previous figure, wherein the manipulation(s) results imperceptible to human vision during display of the manipulated video frame(s).
Figure 3B:
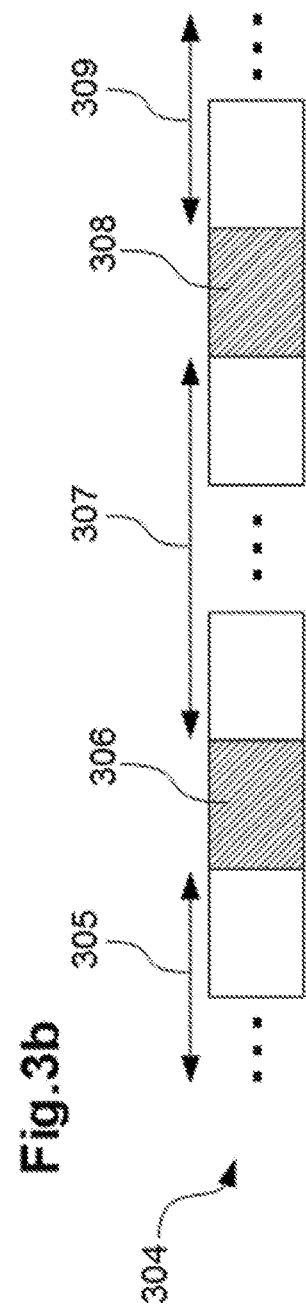

FIGS. 3a and 3b schematically represent different ways of manipulating video frame(s) in the context of detection methods such as those illustrated by previous figure, the manipulation(s) resulting imperceptible to human vision during display of the manipulated video frame(s).

As described in other parts of the disclosure, the video signal may include a sequence of video frames with a given frequency of video frames, and the dynamic pattern may include corresponding pattern frames. Video frames may be manipulated by replacing the video frame and/or overlapping at least part of the video frame with corresponding pattern frame, so that a clearly detectable variation or evolution of power consumption of the OLED panel is induced.

FIG. 3a schematically illustrates an OLED-based screen 300 suitable for displaying manipulated video frames in a manner that manipulations are imperceptible to human vision. Video frames may be manipulated (through the aforementioned replacement and/or overlapping) in such a way that the manipulation is displayable on a physically covered part 303 of the OLED display panel 300. This physical coverage may comprise, for example, a screen frame 302 of the OLED panel 300, so that a perceptible (or observable) region 301 and an imperceptible (or hidden) region 303 of the OLED panel 300 are distinguished.

FIG. 3b schematically shows a manipulated video signal 304 including a sequence of video frames 305-309 with a frequency greater than a frequency threshold, so that distorting pattern frames included in the single video frame 306, 308 may result substantially imperceptible to human vision. The frequency threshold may be, for example, between 20 and 40 video frames per second. The sequence of video frames may include the manipulated video frames 306, 308 (i.e., with an added pattern frame) and the non-manipulated video frames 305, 307, 309 (i.e., without an added pattern frame).

The video frame 306 with the added pattern frame may be preceded by a series of the non-manipulated video frames 305 and/or succeeded by a series of the non-manipulated video frames 307, and the video frame 308 with the added pattern frame may be preceded by a series of the non-manipulated video frames 307 and/or succeeded by a series of the non-manipulated video frames 309. The number of non-manipulated video frames in any of the series of non-manipulated video frames 305, 307, 309 may be defined depending on the frequency of the video signal (frames per second), so that displaying of "distorting" pattern frame(s) included in the manipulated video frames 306, 308 may be substantially imperceptible to human vision.

The frame pattern added to one of the manipulated video frames 306, 308 may include white as predominant color (high power consumption), and the frame pattern added to the other of the manipulated video frames 306, 308 may include black as predominant color (low power consumption). Other colors or combination of colors (different from white and/or black) may be considered with the aim of inducing a clearly detectable variation or evolution of power consumption of the OLED panel during the display of the manipulated video signal 304.

Variations of the principles described with respect to FIGS. 3a and 3b are possible in other examples. For instance, in some applications, a single pattern frame may suffice to generate a clearly detectable change in power consumption of the display panel. Particularly, in applications wherein a display panel emits in real time images captured by a camera, a single pattern frame with either white or black as predominant color may be added into corresponding video frame of the video signal.

In an example, if it is detected that the display panel is emitting predominantly dark images (from e.g., a nocturnal environment), an outstanding change in power consumption (of the OLED panel) may be induced by adding into the video signal a single pattern frame with white as predominant color. The detection of dark images may be implemented based on the time of day (sunlight or night time), weather conditions received through communications network (e.g., Internet), or any known method of image analysis, etc.

In another example, if it is detected that the display panel is emitting predominantly bright images (from e.g., a sunny environment), a significant change in power consumption (of the OLED panel) may be induced by adding into the video signal a single pattern frame with black as predominant color. The detection of bright images may be implemented based on the time of day (sunlight or night time), weather conditions received through communications network (e.g., Internet), any known method of image analysis, etc.

A same detection method may use any of the approaches previously described with respect to FIGS. 3a and 3b (or any combination of them) for causing the manipulated video signal to be displayable with the added dynamic pattern imperceptible to human vision.

Any of the detection methods according to the present disclosure may have a direct implication in Functional Safety that allows increasing the safety integrity level of the display panel for its use on safety critical applications (SIL or ASIL).

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

What is claimed is:
1. A method for detecting a correct or an incorrect operation of a display panel during a display of a video signal, the display panel being associable with a controller system, and the method comprising:

adding, by the controller system, a dynamic pattern into the video signal for inducing the display panel to display the video signal with the added dynamic pattern that is imperceptible to human vision, and to provoke an expected power consumption evolution during the display of the video signal with the added dynamic pattern;

measuring, by the controller system, power consumed by the display panel during the display of the video signal with the added dynamic pattern to determine an actual power consumption evolution; and determining, by the controller system, whether the actual power consumption evolution corresponds to the expected power consumption evolution, wherein the video signal includes a sequence of video frames with a given frequency of video frames, and the dynamic pattern includes one or more pattern frames; and wherein adding the dynamic pattern into the video signal comprises:

adding, by the controller system, a pattern frame into a video frame for inducing the display panel to display the video signal with displaying of the added pattern frame on a physically covered part of the display panel, so that displaying of the added pattern frame is imperceptible to human vision.

2. The method according to claim 1, wherein determining whether the actual power consumption evolution corresponds to the expected power consumption evolution comprises:

determining, by the controller system, whether a deviation between the expected power consumption evolution and the actual power consumption evolution are within a predetermined deviation threshold or range.

3. The method according to claim 1, wherein the frequency of video frames is greater than a frequency threshold, so that distortion included in a single video frame is imperceptible to human vision; and wherein adding the dynamic pattern into the video signal comprises:

adding, by the controller system, a pattern frame into a video frame in such a way that the video frame with the added pattern frame is preceded in the sequence of video frames by a first number of consecutive video frames without the added pattern frame, or is succeeded in the sequence of video frames by a second number of consecutive video frames without the added pattern frame, so that displaying of the added pattern frame is imperceptible to human vision.

4. The method according to claim 1, wherein adding the pattern frame into the video frame comprises adding, by the controller system, the pattern frame into the video frame in such a way that the video frame is replaced by another video frame including the pattern frame, or at least part of the video frame is overlapped by the pattern frame.

5. The method according to claim 1, wherein adding the pattern frame into the video frame comprises adding, by the controller system, the pattern frame with white as predominant color into at least one of the video frame or the pattern frame with black as predominant color into the video frame.

6. The method according to claim 1, wherein the display panel is a Light Emitting Diode (LED) display panel or an Organic-LED (OLED) display panel.

7. A computer program product comprising program instructions for causing a controller system to perform the method of claim 1 for detecting the correct or the incorrect operation of the display panel.

8. A controller system for detecting a correct or an incorrect operation of a display panel during display of a video signal, the display panel being associable with the controller system, and the controller system comprising:

a memory device; and a processor coupled to the memory device to:

add a dynamic pattern into the video signal for inducing the display panel to display the video signal with the added dynamic pattern that is imperceptible to human vision, and to provoke an expected power consumption evolution during the display of the video signal with the added dynamic pattern;

measure power consumed by the display panel during the display of the video signal with the added dynamic pattern to determine an actual power consumption evolution; and determine whether the actual power consumption evolution corresponds to the expected power consumption evolution, wherein the video signal includes a sequence of video frames with a given frequency of video frames, and the dynamic pattern includes one or more pattern frames, and wherein the processor adds a pattern frame into a video frame for inducing the display panel to display the video signal with displaying of the added pattern frame on a physically covered part of the display panel so that displaying of the added pattern frame is imperceptible to human vision.

9. The controller system of claim 8 wherein the processor determines whether a deviation between the expected power consumption evolution and the actual power consumption evolution is within a predetermined deviation threshold or range.

10. The controller system of claim 8, wherein the frequency of the video frames is greater than a frequency threshold so that a distortion included in a single video frame is imperceptible to human vision.

11. A method for detecting a correct or an incorrect operation of a display panel during a display of a video signal, the display panel being associable with a controller system, and the method comprising:

adding, by the controller system, a dynamic pattern into the video signal for inducing the display panel to display the video signal with the added dynamic pattern that is imperceptible to human vision, and to provoke an expected power consumption evolution during the display of the video signal with the added dynamic pattern;

measuring, by the controller system, power consumed by the display panel during the display of the video signal with the added dynamic pattern to determine an actual power consumption evolution; and determining, by the controller system, whether the actual power consumption evolution corresponds to the expected power consumption evolution, wherein the video signal includes a sequence of video frames with a given frequency of video frames, and the dynamic pattern includes one or more pattern frames;

wherein the frequency of video frames is greater than a frequency threshold, so that distortion included in a single video frame is imperceptible to human vision; and wherein adding the dynamic pattern into the video signal comprises:

adding, by the controller system, a pattern frame into a video frame in such a way that the video frame with the added pattern frame is preceded in the sequence of video frames by a first number of consecutive video frames without the added pattern frame, or is succeeded in the sequence of video frames by a second number of consecutive video frames without the added pattern frame, so that displaying of the added pattern frame is imperceptible to human vision.

* * * * *